United States Patent
Weiss et al.

(10) Patent No.: US 10,052,850 B2
(45) Date of Patent: Aug. 21, 2018

(54) ENCAPSULATED PLASTIC PANEL AND METHOD OF MAKING THE SAME

(71) Applicant: EXATEC, LLC, Wixom, MI (US)

(72) Inventors: Keith D. Weiss, Fenton, MI (US); Steven M. Gasworth, Wixom, MI (US); Sunitha K. Grandhee, Novi, MI (US); Wilfried Hedderich, Hilden (DE)

(73) Assignee: EXATEC, LLC, Wixom, MI (US)

( * ) Notice: Subject to any disclaimer, the term of this patent is extended or adjusted under 35 U.S.C. 154(b) by 89 days.

(21) Appl. No.: 14/842,164

(22) Filed: Sep. 1, 2015

(65) Prior Publication Data
US 2015/0367612 A1    Dec. 24, 2015

Related U.S. Application Data

(60) Continuation of application No. 14/467,133, filed on Aug. 25, 2014, now Pat. No. 9,139,242, which is a (Continued)

(51) Int. Cl.
*B32B 3/10* (2006.01)
*B32B 27/08* (2006.01)
(Continued)

(52) U.S. Cl.
CPC ........ *B32B 27/08* (2013.01); *B29C 45/14336* (2013.01); *B29C 45/14811* (2013.01);
(Continued)

(58) Field of Classification Search
None
See application file for complete search history.

(56) References Cited

U.S. PATENT DOCUMENTS

| 4,076,788 A | 2/1978 | Ditto |
| 4,081,578 A | 3/1978 | Van Essen et al. |

(Continued)

FOREIGN PATENT DOCUMENTS

| EP | 0285870 A2 | 10/1988 |
| EP | 0597624 A1 | 5/1994 |

(Continued)

OTHER PUBLICATIONS

Material Safety Data Sheet Thermocure 948 (http://diverprint.com/images/stories/msds/P-Line-Inks-and-Solvents/MSDS_Proell_Thermo-Jet/Thermo-Jet-948_MSDS.pdf) retreived on Jan. 23, 2017.*

(Continued)

*Primary Examiner* — Christopher Polley
(74) *Attorney, Agent, or Firm* — Cantor Colburn LLP

(57) ABSTRACT

An economical method of manufacturing a plastic glazing panel having an encapsulation for aesthetic purposes and to enhance the sealing of the glazing panel to the vehicle is presented. This method includes the steps of forming a plastic panel having an A-side and B-side; printing an opaque border from an ink with the border being in contact with the B-side of the panel and substantially encircling the perimeter of the panel; curing the ink of the opaque border; applying a weatherable layer on the printed border and the plastic panel; curing the weatherable layer; depositing an abrasion resistant layer on the weatherable layer; placing the plastic panel into a mold having a soft gasket; injecting an elastomeric material to form an encapsulation that substantially encircles the perimeter of the plastic panel and encompasses the A-side; B-side and edge of the plastic panel; and removing the plastic panel from the mold.

19 Claims, 3 Drawing Sheets

Related U.S. Application Data division of application No. 12/113,656, filed on May 1, 2008, now abandoned.

(60) Provisional application No. 60/915,274, filed on May 1, 2007.

(51) Int. Cl.

| | | |
|---|---|---|
| *B29C 45/14* | (2006.01) | |
| *B29C 70/76* | (2006.01) | |
| *B60J 1/00* | (2006.01) | |
| *B60J 7/00* | (2006.01) | |
| *C09D 11/101* | (2014.01) | |
| *C09D 11/104* | (2014.01) | |
| *B32B 38/00* | (2006.01) | |
| *B62D 65/06* | (2006.01) | |
| *B32B 27/30* | (2006.01) | |
| *B32B 27/36* | (2006.01) | |
| *B29L 31/30* | (2006.01) | |
| *B29L 31/00* | (2006.01) | |

(52) U.S. Cl.
CPC .......... *B29C 70/763* (2013.01); *B32B 27/304* (2013.01); *B32B 27/365* (2013.01); *B32B 38/00* (2013.01); *B32B 38/145* (2013.01); *B60J 1/00* (2013.01); *B60J 7/00* (2013.01); *B62D 65/06* (2013.01); *C09D 11/101* (2013.01); *C09D 11/104* (2013.01); *B29C 45/14434* (2013.01); *B29C 2795/00* (2013.01); *B29K 2995/002* (2013.01); *B29K 2995/0025* (2013.01); *B29K 2995/0087* (2013.01); *B29L 2031/30* (2013.01); *B29L 2031/778* (2013.01); *B32B 2255/10* (2013.01); *B32B 2255/20* (2013.01); *B32B 2255/26* (2013.01); *B32B 2255/28* (2013.01); *B32B 2305/72* (2013.01); *B32B 2307/41* (2013.01); *B32B 2307/584* (2013.01); *B32B 2307/712* (2013.01); *B32B 2605/006* (2013.01); *Y10T 428/239* (2015.01); *Y10T 428/24777* (2015.01)

(56) References Cited

U.S. PATENT DOCUMENTS

| | | |
|---|---|---|
| 4,189,517 A | 2/1980 | Shanoski et al. |
| 4,222,929 A | 9/1980 | Shanoski et al. |
| 4,293,659 A | 10/1981 | Svoboda |
| 4,366,109 A | 12/1982 | Svoboda |
| 4,534,888 A | 8/1985 | Cobbledick et al. |
| 4,637,904 A | 1/1987 | Rounds |
| 4,668,460 A | 5/1987 | Ongena |
| 4,842,941 A | 6/1989 | Devins et al. |
| 5,387,750 A | 2/1995 | Chiang |
| 5,529,728 A | 6/1996 | Buazza et al. |
| 5,658,672 A | 8/1997 | Lenke et al. |
| 5,676,901 A | 10/1997 | Higashi et al. |
| 5,693,366 A | 12/1997 | Mase et al. |
| 5,718,967 A | 2/1998 | Hu et al. |
| 5,736,090 A | 4/1998 | Yamamoto et al. |
| 5,777,053 A | 7/1998 | McBain et al. |
| 5,902,534 A | 5/1999 | Fujishiro et al. |
| 5,915,780 A | 6/1999 | Kobrehel et al. |
| 6,126,792 A | 10/2000 | Grunwald et al. |
| 6,180,043 B1 | 1/2001 | Yonemochi et al. |
| 6,309,755 B1 | 10/2001 | Matsco et al. |
| 6,617,033 B1 | 9/2003 | Straus et al. |
| 6,720,076 B2 | 4/2004 | McBain |
| 6,793,861 B2 | 9/2004 | McBain et al. |
| 6,797,384 B2 | 9/2004 | Gasworth et al. |
| 6,822,058 B1 | 11/2004 | Kramer et al. |
| 6,890,469 B2 | 5/2005 | Straus et al. |
| 6,890,586 B2 | 5/2005 | Beck et al. |
| 7,045,213 B2 | 5/2006 | Straus |
| 7,309,221 B2 | 12/2007 | Okahara et al. |
| 7,314,590 B2 | 1/2008 | Yeager |
| 7,703,413 B2 | 4/2010 | Miebach et al. |
| 7,732,041 B2 | 6/2010 | Grandhee et al. |
| 7,871,555 B2 | 1/2011 | Orten et al. |
| 2001/0038890 A1 | 11/2001 | Buazza et al. |
| 2001/0041251 A1 | 11/2001 | Bravet et al. |
| 2002/0015801 A1 | 2/2002 | Emch |
| 2002/0041346 A1 | 4/2002 | Faris et al. |
| 2002/0110695 A1 | 8/2002 | Yang et al. |
| 2002/0136909 A1 | 9/2002 | Yang |
| 2002/0164484 A1 | 11/2002 | Jiang et al. |
| 2003/0003280 A1 | 1/2003 | Masterson et al. |
| 2003/0030172 A1 | 2/2003 | Hoogland et al. |
| 2003/0045637 A1 | 3/2003 | Hoshida et al. |
| 2003/0072881 A1 | 4/2003 | Yang et al. |
| 2004/0115302 A1 | 6/2004 | Rommes et al. |
| 2004/0148051 A1 | 7/2004 | Straus |
| 2004/0191521 A1 | 9/2004 | Weiss et al. |
| 2005/0156351 A1 | 7/2005 | Straus et al. |
| 2005/0158554 A1 | 7/2005 | Wang et al. |
| 2005/0202184 A1 | 9/2005 | Iacovangelo et al. |
| 2005/0202263 A1 | 9/2005 | Sargent et al. |
| 2005/0284374 A1 | 12/2005 | Miebach et al. |
| 2006/0025496 A1* | 2/2006 | Grandhee ............ C09D 11/102 523/160 |
| 2006/0076712 A1 | 4/2006 | Yonemochi et al. |
| 2006/0097425 A1 | 5/2006 | Okahara et al. |
| 2006/0118999 A1 | 6/2006 | Cooper et al. |
| 2006/0125151 A1 | 6/2006 | McBain et al. |
| 2006/0138699 A1 | 6/2006 | Zollner et al. |
| 2006/0204746 A1 | 9/2006 | Li et al. |
| 2006/0210772 A1 | 9/2006 | Bui et al. |
| 2007/0212548 A1* | 9/2007 | Lefaux ............ B05D 5/00 428/411.1 |
| 2008/0241470 A1 | 10/2008 | Leclercq et al. |
| 2011/0241243 A1 | 10/2011 | Wootton |

FOREIGN PATENT DOCUMENTS

| | | |
|---|---|---|
| EP | 0892209 A2 | 1/1999 |
| EP | 1060930 A1 | 12/2000 |
| EP | 1207031 A1 | 5/2002 |
| JP | 62025024 A | 2/1987 |
| WO | 0078520 A1 | 12/2000 |
| WO | 2006072177 A1 | 7/2006 |
| WO | 2006121484 A2 | 11/2006 |

OTHER PUBLICATIONS

"Coatings for Plastic Glazing," Automotive Engineering, Society of Automotive Engineers, Warrendale, Pennsylvania, U.S., vol. 101, No. 5, May 1993, pp. 24-28.

Aengenheyster: "Grosser Markt Fuer Grosse Scheiben," Plastverarbeiter, Huethig GmbH, Heidelberg, Germany, vol. 55, No. 10, Oct. 2004, pp. 146-149.

Definition of Sequentially, Merriam-Webster (online dictionary).

Hopmann C et al: "Automobilscheiben aus Kunststoff," Kunststoffe, Carl Hanser Verlag, Munchen, Germany, No. 2/05, Feb. 2005, pp. 22-27.

International Search Report and Written Opinion of the International Searching Authority; International Application No. PCT/US2008/062251; International Filing Date: May 1, 2008; dated Aug. 11, 2008; 14 Pages.

International Search Report; International Application No. PCT/US2008/061748; International Filing Date: Apr. 28, 2008; dated Sep. 11, 2009; 15 pages.

Schaepkens et al; High-rate deposition of abrasion resistant coatings using a dual-source expanding thermal plasma reactor; J. Vac. Sci. Technolo. A21(4); Jul./Aug. 2003; pp. 1266-1271.

(56) References Cited

OTHER PUBLICATIONS

Written Opinion of the International Searching Authority; International Application No. PCT/US2008/061748; International Filing Date: Apr. 28, 2008; dated Sep. 11, 2008; 15 pages.

* cited by examiner

ENCAPSULATED PLASTIC PANEL AND METHOD OF MAKING THE SAME

CROSS REFERENCE TO RELATED APPLICATIONS

This application is a continuation of U.S. Nonprovisional application Ser. No. 14/467,133 filed on Aug. 25, 2014 which is a divisional application of U.S. Nonprovisional application Ser. No. 12/113,656 filed on May 1, 2008 which claims the benefit of U.S. Provisional Application Ser. No. 60/915,274 filed on May 1, 2007, the entire contents of which are incorporated herein by reference.

TECHNICAL FIELD

This invention relates to plastic glazing panels that are encapsulated to promote sealing and appearance when used as a window or sunroof.

BACKGROUND

For a number of years, car manufacturers have favored window encapsulation for the sealing of automotive glass. Such encapsulation technology includes molding an elastomeric gasket directly onto the surface of the glass. These gaskets are typically made from a variety of materials including thermoplastic elastomers (TPE) and polyvinyl chloride (PVC), as well as cross-linked polyurethanes applied via reaction injection molding (RIM). The encapsulation process for a conventional glass window may be described as including the steps of applying a primer or adhesion promoter to the perimeter of the one side of the window; applying heat to this side of the window to activate the primer; placing the window in a mold; injecting the thermoplastic elastomer onto the primer and the adjacent surface of the window; removing the window from the mold, and trimming any excess elastomeric material that has accumulated at the interface between the window and the encapsulation. Such excess or scrap elastomeric material is known by one skilled-in-the-art of encapsulation as "flash" material. The trimming of the "flash" material is typically done with a sharp object, such as a knife or razor blade. The encapsulated glass window is then fixed into the opening of a vehicle typically through the use of an adhesive system, such as the urethane BETASEAL™ system offered by Dow Automotive, Auburn Hills, Mich.

The use of plastic glazing panels provides several issues for the use of conventional encapsulation technology. First, plastic glazing panels are typically coated with a weatherable coating system, such as the acrylic primer (e.g., SHP401 and SHP470) and silicone hard-coat (e.g., AS4000 and AS4700) systems offered by Momentive Performance Materials, Wilton, Conn. in order for the glazing panel to survive exposure to the environment. Unfortunately the surface properties associated with a silicone hard-coat is such that most conventional encapsulation materials cannot effectively adhere, thereby, creating a weakened interface that will cause the plastic glazing after being fixed to a vehicle to prematurely fail. The known remedy for this situation has been to apply the encapsulation to the bare plastic panel (e.g., no protective coatings). However, this solution requires a masking step before applying the weatherable coating and a de-masking step after the weatherable coating is cured. The addition of these two steps increases the costs associated with manufacturing an encapsulated plastic glazing panel.

Second, plastic glazing systems are not as hard as a conventional glass window. Thus the trimming of any "flash" material created by the encapsulation process will result in irreversible damage to the coating system of the plastic glazing panel. This damage will ultimately result in premature degradation of the properties exhibited by the plastic glazing panel.

Finally, plastic glazing panels exhibit different thermal expansion characteristics than glass windows. Thus heating the surface of the plastic glazing panel to activate any adhesion promoter used to facilitate adhesion between the plastic glazing panel and the encapsulation will cause substantial distortion to the shape of the window. Such a distortion will result in the operator having difficulty in securing the window into the mold during the encapsulation process. Thus this process will suffer from an increase in cycle time and an overall loss in productivity.

Therefore, there is a need in the industry to develop a plastic glazing panel and a process in which the plastic glazing panel can be encapsulated without degrading the properties exhibited by the plastic glazing panel or affecting cycle time or productivity.

BRIEF SUMMARY

An economical method of manufacturing a plastic glazing panel having an encapsulation for aesthetic purposes and to enhance the sealing of the glazing panel to the vehicle is presented. This economical method includes the steps of forming a plastic panel having an A-side and B-side; printing an opaque border from an ink with the border being in contact with the B-side of the panel and substantially encircling the perimeter of the panel; curing the ink of the opaque border; applying a weatherable layer on the printed border and the plastic panel; curing the weatherable layer; depositing an abrasion resistant layer on the weatherable layer; placing the plastic panel into a mold having a soft gasket; injecting an elastomeric material to form an encapsulation that substantially encircles the perimeter of the plastic panel and encompasses the A-side, B-side, and edge of the plastic panel; and finally removing the plastic panel from the mold. The use of a soft gasket in the mold reduces or eliminates the occurrence of "flash" material being generated at the edge of the interface between the encapsulation and the plastic glazing panel.

Optionally the step of applying an adhesion promoter on top of the abrasion resistant layer encircling the B-side perimeter of the plastic panel may take place prior to placing the plastic panel into the mold to form the encapsulation. The plastic panel is then heated on the A-side and B-side of the plastic panel in close temporal proximity to activate the adhesion promoter without substantially distorting the shape of the window.

In another embodiment of the present invention, the steps of printing an opaque border from an ink and curing the ink on the plastic panel is replaced with the steps of printing an opaque border from an ink on to a plastic film; curing the ink on the plastic film; and forming and adhering the opaque border and the plastic film to the B-side of the plastic panel so that the opaque border substantially encircles the perimeter of the plastic panel.

In another embodiment of the present invention, the encapsulated plastic glazing panel comprises a substantially transparent plastic panel having an A-side, B-side, and an edge; an opaque border in contact with the B-side of the plastic panel and that substantially encircles the perimeter of the plastic panel; a weatherable layer in contact with the opaque border and the plastic panel; an abrasion resistant layer in contact with the weatherable layer; and an encapsulation in contact with the abrasion resistant layer and that substantially encircles the perimeter of the plastic panel and encompasses the A-side, B-side, and edge of the plastic panel.

In another embodiment of the present invention, the plastic glazing panel further comprises a plastic film that has one side of the film in contact with the opaque border and the B-side of the plastic panel and the other side of the film in contact with the weatherable layer.

In another embodiment of the present invention, the weatherable layer may include a single layer or multiple layers, such as a primer and a topcoat. The weatherable layer uses ultraviolet absorbing (UVA) molecules to protect the plastic panel from UV radiation.

In another embodiment of the present invention, the abrasion resistant layer is deposited using a vacuum deposition technique. One example of an abrasion resistant layer includes, but is not limited to, silicon oxy-carbide having a composition ranging from $SiO_x$ to $SiO_xC_yH_z$.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
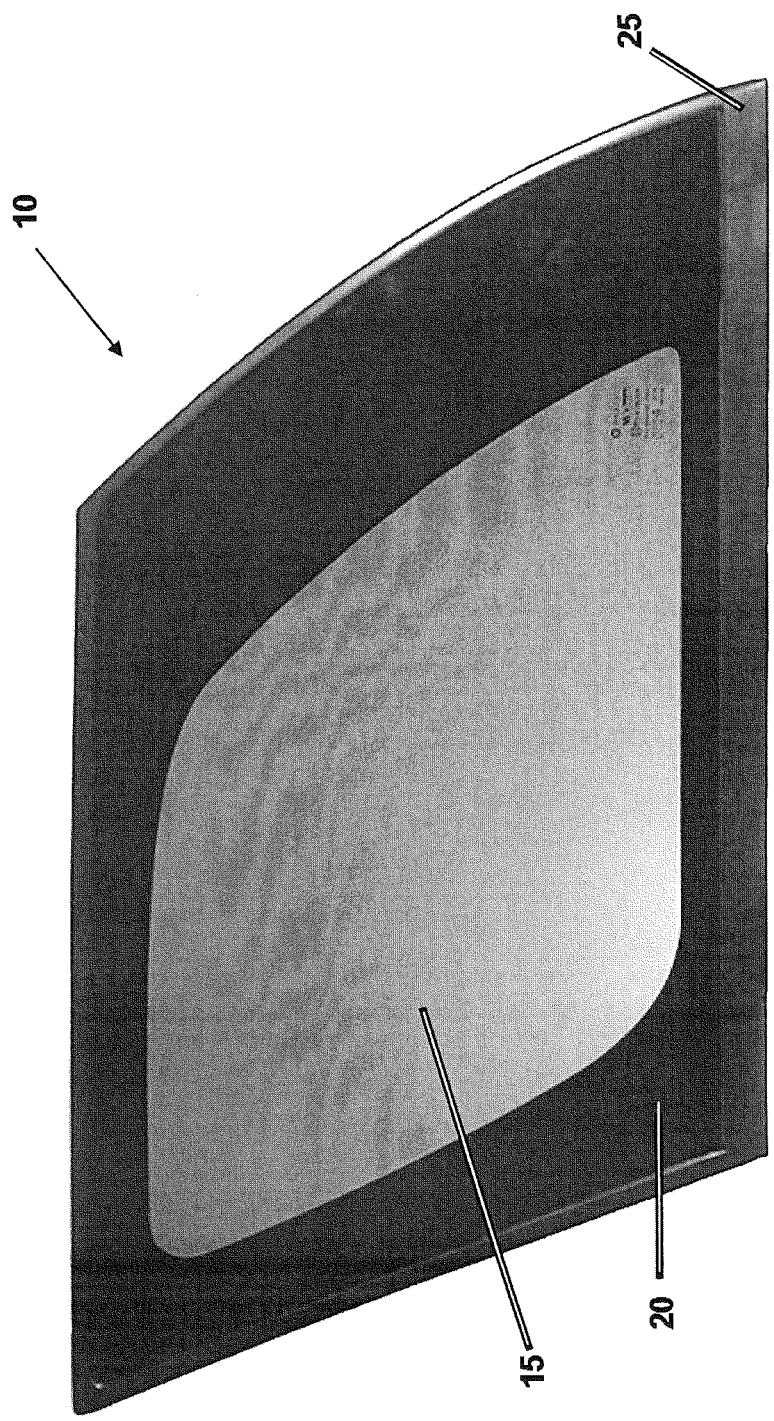
FIG. 1 is a depiction of an automobile window according to the principles of the present invention.

The following description is merely exemplary in nature and is in no way intended to limit the present disclosure or its application or uses. It should be understood that throughout the description and drawings, corresponding reference numerals indicate like or corresponding parts and features.

The present invention provides a plastic glazing panel and an economical method of manufacturing such as a glazing panel that includes the application of encapsulation that substantially encircles the perimeter of the window. The plastic glazing panel also includes a decorative printed border and a protective coating system to provide a high level of weatherability and abrasion resistance. Referring to FIG. 1, a plastic glazing panel may be used as an automotive fixed side window 10. The window 10 is shown having a substantially transparent viewing area 15, a printed opaque border 20 encompassing the transparent viewing area 15, and an encapsulation 25 encircling the perimeter of the glazing panel 10. One skilled-in-the-art of automotive design will realize that the plastic glazing panel of the present invention can be used for other automotive windows, such as a backlite, sunroof, and movable side windows, among others.

Figure 2:
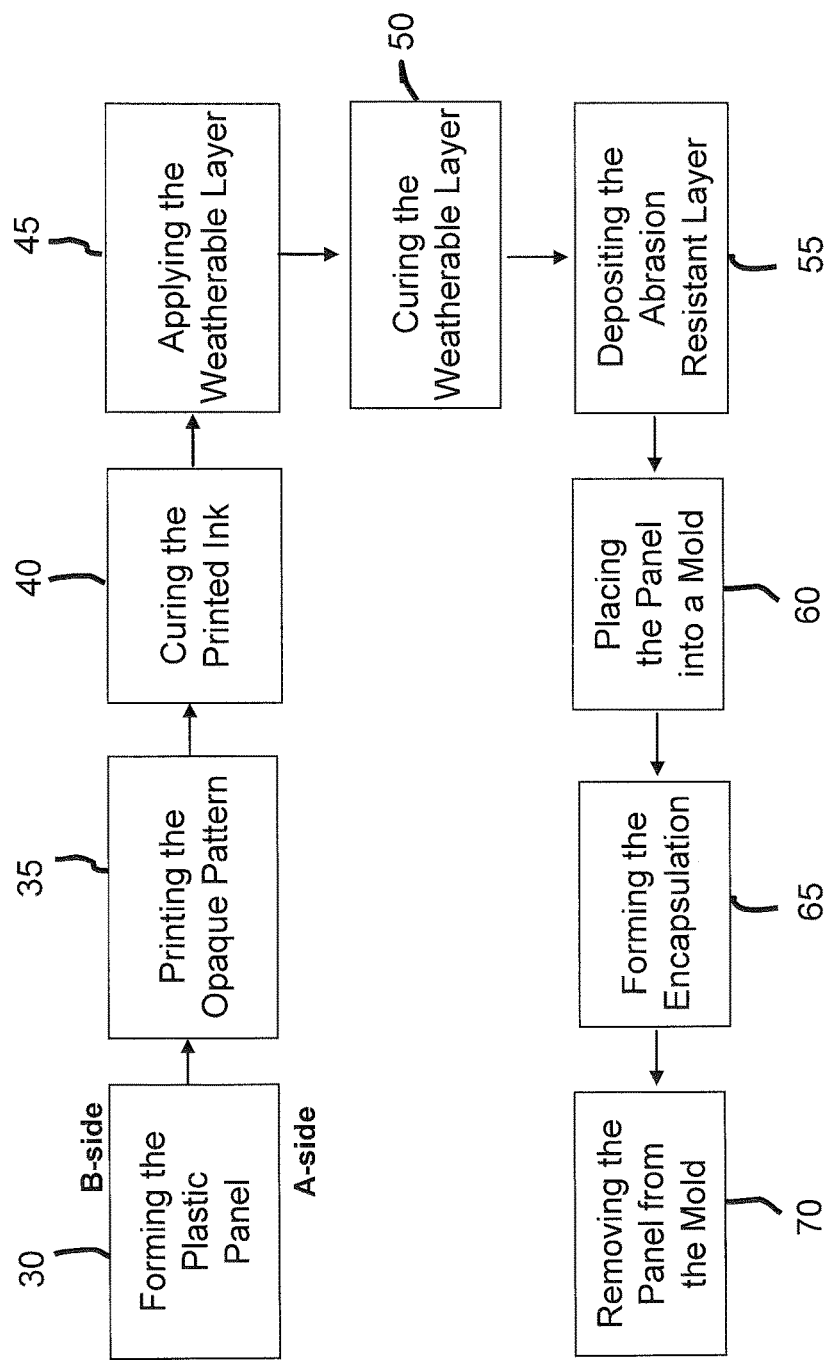
FIG. 2 is a schematic of a manufacturing process for a plastic glazing panel according to one embodiment of the present invention.

Referring to FIG. 2, an economical manufacturing process may generally be defined by first forming 30 a plastic panel; then printing 35 an opaque border with an ink on the plastic panel; followed by curing 40 the printed ink; applying 45 a weatherable layer onto the printed plastic panel; curing 50 the weatherable layer, depositing 55 an abrasion resistant layer onto the weatherable layer, placing 60 the panel into a mold; forming 65 the encapsulation by injecting an encapsulating material to the outer perimeter of the glazing panel, and then removing 70 the encapsulated glazing panel from the mold.

The transparent plastic panel may be formed 30 into a window, e.g., vehicle window, from plastic pellets or sheets through the use of any known technique to those skilled-in-the-art, such as extrusion, molding, which includes injection molding, blow molding, and compression molding, or thermoforming, which includes thermal forming, vacuum forming, and cold forming. It is to be noted that the forming 30 of a window using a plastic sheet may occur prior to printing as shown in FIG. 2, after printing 35 and curing 40 of the ink, or after application 45 and curing 50 of the weatherable coating without falling beyond the scope or spirit of the present invention. The use of plastic pellets to form 30 the plastic panel is done prior to printing 35 the opaque pattern.

An opaque border may be defined as a substantially opaque ink printed or applied 35 for decorative purposes and/or to hide or mask other vehicle components (e.g., adhesives). This opaque border may be applied 35 to the periphery of the transparent substrate to form a solid masking border. The opaque border may further include a fade-out pattern to transition the border into the viewing region of the window. The fade-out pattern may incorporate a variety of shapes of variable size including dots, rectangles (lines), squares, and triangles, among others.

In one embodiment of the present invention, the opaque border can be printed 35 onto the surface of the plastic panel via screen printing. Other known methods of printing 35 the opaque border on the plastic panel may also be utilized when deemed appropriate. A non-inclusive list of other known printing methods include pad printing, membrane image transfer printing, cylindrical printing, digital printing, robotic dispensing, mask/spray, ink-jet printing, and the like. The thickness of the printed ink may range from about 2 micrometers to about 1 mil (25.4 micrometers) with about 6 to 12 micrometers being preferred.

Once the ink is printed 35, drying or curing 40 should be thorough in order to ensure that any retained solvent is removed from the print. The inks may be thermally cured by being exposed to an elevated temperature for a period of time, cured upon exposure to UV radiation, or via a combination thereof. The thickness of the cured ink print is typically about 4 micrometers to 20 micrometers with between about 6 micrometers to 18 micrometers being preferred.

The weatherable layer is applied 45 to the printed panel by dip coating, flow coating, spray coating, curtain coating, spin coating, or any other techniques known to those skilled-in-the-art. The thickness of the weatherable layer may range from about 2 micrometers to several mils (1 mil=25.4 micrometers), with about 6 micrometers to 1 mil being preferred. The weatherable layer may then be cured 50 using a mechanism selected as one of air drying, UV absorption, thermal absorption, condensation addition, thermally driven entanglement, cross-linking induced by cationic or anionic species, or a combination thereof.

The weatherable layer is over-coated via the deposition 55 of an abrasion resistant layer. This abrasion resistant layer may be either comprised of one layer or a combination of multiple inter-layers of variable composition. The abrasion resistant layer is applied by any vacuum deposition technique known to those skilled-in-the-art, including but not limited to plasma-enhanced chemical vapor deposition (PECVD), expanding thermal plasma PECVD, plasma polymerization, photochemical vapor deposition, ion beam deposition, ion plating deposition, cathodic arc deposition, sputtering, evaporation, hollow-cathode activated deposition, magnetron activated deposition, activated reactive evaporation, thermal chemical vapor deposition, and any known sol-gel coating process.

In one embodiment of the present invention, a specific type of PECVD process used to deposit the abrasion resistant layers comprising an expanding thermal plasma reactor is preferred. This specific process (called hereafter as an expanding thermal plasma PECVD process) is described in detail in U.S. patent application Ser. No. 10/881,949 (filed Jun. 28, 2004) and U.S. patent application Ser. No. 11/075,343 (filed Mar. 8, 2005), the entirety of both being hereby incorporated by reference. In an expanding thermal plasma PECVD process, a plasma is generated via applying a direct-current (DC) voltage to a cathode that arcs to a corresponding anode plate in an inert gas environment. The pressure near the cathode is typically higher than about 150 Torr, e.g., close to atmospheric pressure, while the pressure near the anode resembles the process pressure established in the plasma treatment chamber of about 20 mTorr to about 100 mTorr. The near atmospheric thermal plasma then supersonically expands into the plasma treatment chamber.

The reactive reagent for the expanding thermal plasma PECVD process may comprise, for example, octamethylcyclotetrasiloxane (D4), tetramethyldisiloxane (TMDSO), hexamethyldisiloxane (HMDSO), vinyl-D4 or another volatile organosilicon compound. The organosilicon compounds are oxidized, decomposed, and polymerized in the arc plasma deposition equipment, typically in the presence of oxygen and an inert carrier gas, such as argon, to form an abrasion resistant layer.

The plastic glazing panel is then placed 60 into a mold whose cavity is formed to the shape of the glazing panel. The mold is equipped with a soft gasket to seal the substantially transparent viewing portion of the glazing panel from the subsequent injection of the encapsulation material that forms 65 the encapsulation. The gasket provides an effective stop to the flow of the encapsulation material, thereby, eliminating the formation of any "flash" material at the edge of the interface between the encapsulation and the glazing panel. The existence of "flash" material is found to cause the formation of wrinkles or blemishes in the abrasion resistant layer of the plastic glazing. In addition, the trimming or removal of "flash" material via the use of a sharp instrument, such as a knife or razor blade, can damage the abrasion resistant layer and the weatherable layer of the plastic glazing panel, as well as possibly the opaque border and the underlying plastic panel itself.

Prior to placing 60 the plastic glazing panel into the mold, an adhesion promoter may optionally be used to enhance adhesion between the abrasion resistant layer and the encapsulation. However, the conventional means of applying and curing or activating the primer is unacceptable for use with a plastic glazing system. The thermal expansion characteristics of a plastic glazing panel are such that applying heat onto one surface of the plastic panel results in reversible expansion or distortion of the shape of the panel. This expansion or distortion results in difficulty in holding the glazing panel by any mechanical means (e.g., robotic, etc.) and in placing 60 the glazing panel into the mold. The application of heat on both surfaces of the glazing panel via substantially simultaneous application is found to minimize or eliminate the occurrence of this distortion. The application of heat to both sides of the window may be accomplished through the use of any means known to one skilled-in-the-art, including, but not limited to, IR heating or forced air heating.

Figure 3:
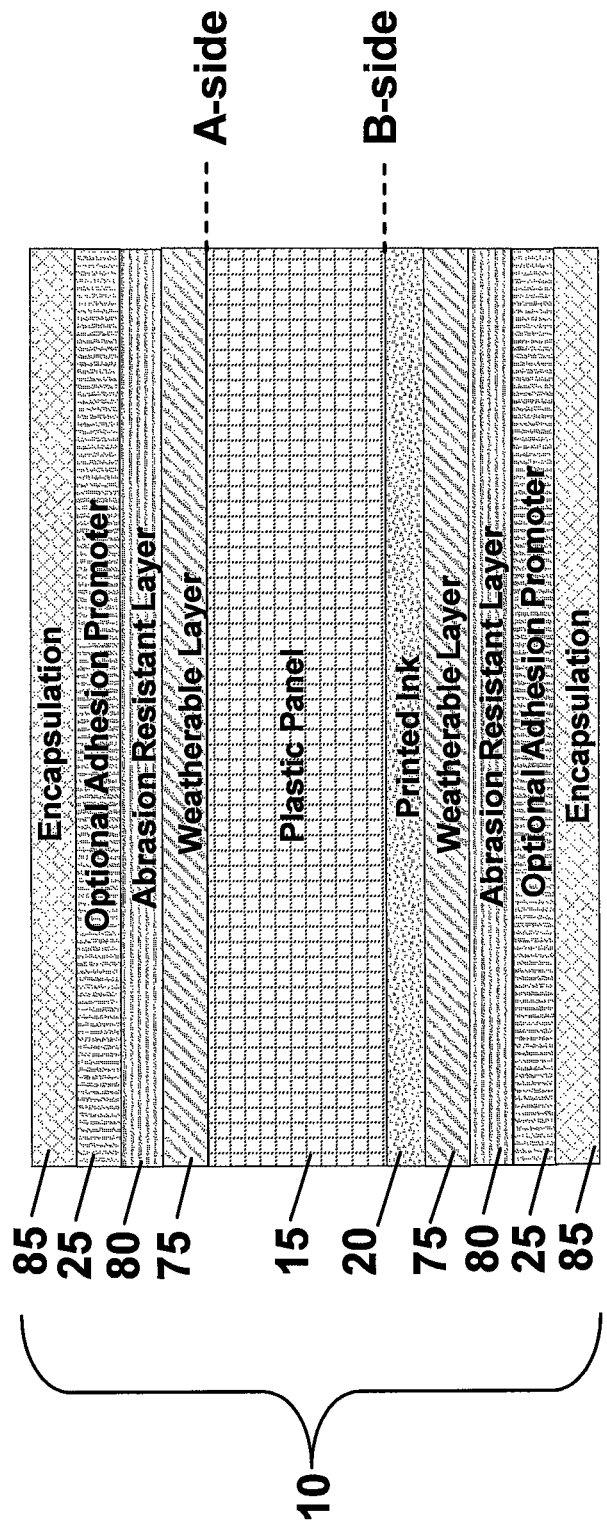
FIG. 3 is a diagrammatic representation of a cross-section of a glazing panel from FIG. 1 according to one embodiment of the present invention.

Referring now to FIG. 3, a cross-section of a plastic glazing panel according to one embodiment of the present invention is shown. The plastic panel 15 may be comprised of any thermoplastic or thermoset polymeric resin. The polymeric resins include, but are not limited to, polycarbonate, acrylic, polyarylate, polyester, and polysulfone, as well as copolymers and mixtures thereof. In order to function appropriately as a window and to allow for the dual curing of the printed ink, the plastic panel 15 is substantially transparent.

The printed ink 20 may be comprised of a thermally curable ink or a UV curable ink. A thermally curable ink may include a polyester-based binder, a polycarbonate-based binder, or a mixture thereof. A UV curable ink may include a mixture of various multifunctional acrylate oligomers and monomers along with a photoinitiator. Examples of inks include Exatec® PIX (Exatec LLC, Wixom, Mich.) and DXT-1599 (Coates Screen, St. Charles, Ill.), among others.

The ink 20 may further comprise other additives, such as colorants (e.g., pigments and/or dyes), fillers, surfactants, defoamers, tackifiers, adhesion promoters, viscosity promoters, weatherability additives. Examples of pigments include, but are not limited to, carbon black, colored organic pigments, and metal oxide pigments; while suitable dyes include various direct dyes, acidic dyes, basic dyes, and/or reactive dyes. Various surfactants and defoamers may include any organic, organosilicon, and silicone molecules that are well known to one skilled-in-the-art to function in such a capacity. In order to enhance the weatherability of the printed and cured ink, the ink may include hindered amines or UV absorber molecules.

The weatherable layer 75 may be comprised of, but not limited to, silicones, polyurethanes, acrylics, polyesters, polyurethane-acrylates, and epoxies, as well as mixtures or copolymers thereof. The weatherable layer 75 preferably includes ultraviolet (UV) absorbing molecules, such as hydroxyphenyltriazine, hydroxybenzophenones, hydroxylphenylbenzotriazoles, hydroxyphenyltriazines, polyaroylresorcinols, 2-(3-triethoxysilylpropyl)-4,6-dibenzoylresorcinol) (SDBR), 4,6-dibenzoylresorcinol (DBR), and cyanoacrylates, among others to protect the underlying plastic panel and printed ink from degradation caused by exposure to the outdoor environment.

The weatherable layer 75 may be comprised of one homogenous layer or multiple sub-layers, such as a primer and a topcoat. A primer typically aids in adhering the topcoat to the plastic panel. The primer, for example, may include, but not be limited to, acrylics, polyesters, epoxies, and copolymers and mixtures thereof. Similarly, the topcoat may include, but not be limited to, polymethylmethacrylate, polyvinylidene fluoride, polyvinylfluoride, polypropylene, polyethylene, polyurethane, silicone, polymethacrylate, polyurethane-acrylates, polyacrylate, polyvinylidene fluoride, silicone hardcoat, and mixtures or copolymers thereof. One specific example of a weatherable layer 75 comprising multiple sub-layers is the combination of an acrylic primer (SHP401 or SHP470, Momentive Performance Materials, Waterford, N.Y.; or SHP-9X, Exatec LLC, Wixom, Mich.) with a silicone hard-coat (AS4000 or AS4700, Momentive Performance Materials; or SHX, Exatec LLC).

A variety of additives may be added to the weatherable layer 75, e.g., to either or both the primer and the topcoat, such as colorants (tints), rheological control agents, mold release agents, antioxidants, and IR absorbing or reflecting pigments, among others. The type of additive and the amount of each additive is determined by the performance required by the plastic glazing panel to meet the specification and requirements for use as a window.

The abrasion resistant layer 80 may be comprised of aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, hydrogenated silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, or a mixture or blend thereof. Preferably, the abrasion resistant layer 80 is comprised of a composition ranging from $SiO_x$ to $SiO_xC_yH_z$ depending upon the amount of carbon and hydrogen atoms that remain in the deposited layer. This preferred silicon oxy-carbide layer provides the surface properties suitable for the subsequent adherence of an encapsulation material.

The encapsulation 25 may be comprised of any known encapsulation material known to one skilled-in-the-art including, but not limited to, polyvinyl chloride (PVC), thermoplastic elastomers, urethanes, and thermoplastic olefins. Optionally an adhesion promoter 85 may be used to enhance the adhesion between the encapsulation and the abrasion resistant layer. Examples of such adhesion promoters include acrylic polymers, urethanes, organosilanes, and chlorinated polyolefin polymers, among others.

The encapsulated glazing panel may be fixed or secured to an opening in a vehicle through any means known to one skilled-in-the-art. Such means include, but are not limited to, the use of clips or fasteners and bonding via the use of adhesives.

Before an encapsulated glazing panel can be used on a vehicle, the glazing panel must pass a series of tests specified by the original equipment manufacturers (OEMs) to be done using either the finished, encapsulated plastic glazing panels or smaller test plaques or coupons that represent the encapsulated glazing panel. One very demanding series of tests used with coupons is specified by Honda Motor Company as specification number N/K. In this test, coupons of the encapsulated glazing system are exposed to various conditions and then the encapsulation is pulled away from the plastic glazing panel under both shear and peel loads. In order to pass each test in this series of tests, the failure mode observed upon separation of the encapsulation from the glazing panel must be 100% cohesive failure of the encapsulation. Any loss of adhesion at any interface within the plastic glazing panel (e.g., between the plastic panel and the ink, the ink and weatherable layer, or weatherable layer and abrasion resistant layer) or between the glazing panel and the encapsulation would constitute a failure.

An example of a standard set of tests performed on finished, encapsulated glazing panels is specified by General Motors as test specification number GM-3611. Similar to the coupon testing, the full glazing panels in this series of tests are exposed to various conditions and the cohesive strength of the encapsulation evaluated by performing both peel- and shear-oriented pull tests. In order to pass each test in this series, the failure mode observed for the separation of the encapsulation and plastic glazing panel must be 100% cohesive failure of the encapsulation. Any loss of adhesion at any interface within the plastic glazing panel or between the glazing panel and encapsulation would constitute a failure. The actual conditions to which full encapsulated glazing panels and test coupons are exposed are shown in Tables 1 and 2, respectfully.

The following specific examples are given to illustrate the invention and should not be construed to limit the scope of the invention.

EXAMPLES

Example 1—Testing of Encapsulated Plastic Glazing Panels

Multiple plastic glazing panels were formed using Lexan® polycarbonate sheet (SABIC Innovative Plastics, Pittsfield, Mass.) to fit a General Motor's Trailblazer SUV as a fixed side window. The formed plastic panel was printed with an opaque border using a thermally curable ink (Exatec® PIX, Exatec LLC, Wixom, Mich.), which was subsequently cured according to the manufacturer's specification. A weatherable layer comprised of an acrylic primer (SHP401, Momentive Performance Materials, Waterford, N.Y.) and a silicon hard-coat (SHX, Exatec LLC) was applied over the opaque border and plastic panel. On top of the weatherable layer, a silicon oxy-carbide abrasion resistant layer was deposited using expanding arc plasma enhanced chemical vapor deposition. The resulting plastic glazing panel is known as the Exatec® 500 glazing system (Exatec LLC, Wixom, Mich.).

An adhesion promoter was then applied around the perimeter of the glazing panel in-line with the opaque border. The adhesion promoter was cured or activated by simultaneously heating both sides of the glazing panel using an IR heating source. The glazing panel was placed into a mold and polyvinyl chloride (Vi-Chem Corporation, Grand Rapids, Mich.) injected to form the encapsulation.

The encapsulated plastic glazing panels were then tested according to General Motors' GM-3611 specification. As shown in Table 1, the encapsulated glazing panels were observed to pass all of the tests listed in this specification by resulting in 100% cohesive failure of the PVC encapsulation. This example demonstrates that an encapsulated plastic glazing panel prepared according to one embodiment of the present invention can pass stringent OEM requirements for use as a window in a vehicle.

TABLE 1

|  | Exposure Conditions | Test Result (Pass = 100% cohesive) |
|---|---|---|
| Initial Pull | Ambient Temperature | PASS |
| Humidity Resistance | 38° C., 100% relative humidity for 7 days | PASS |
| Heat Resistance | 70° C. for 14 days | PASS |
| Thermal Cycle C | Heat, humidity, Cold cycling for 8 weeks | PASS |

Example 2—Testing of Encapsulated Glazing Coupons

Multiple plastic glazing coupons were formed using Lexan® polycarbonate sheet (SABIC Innovative Plastics, Pittsfield, Mass.) to be substantially flat. The formed plastic coupons were printed with an opaque border using a thermally curable ink (Exatec® PIX, Exatec LLC, Wixom, Mich.), which was subsequently cured according to the manufacturer's specification. A weatherable layer comprised of an acrylic primer (SHP401, Momentive Performance Materials, Waterford, N.Y.) and a silicon hard-coat (SHX, Exatec LLC) was applied over each opaque border and plastic coupon. On top of the weatherable layer, a silicon oxy-carbide abrasion resistant layer was deposited using expanding arc plasma enhanced chemical vapor deposition. The resulting plastic glazing coupons represented a glazing system known as the Exatec® 500 glazing system (Exatec LLC, Wixom, Mich.).

An adhesion promoter was then applied around the perimeter of each glazing coupon in-line with the opaque border. The adhesion promoter was cured or activated by simultaneously heating both sides of the glazing coupons. The glazing coupons were placed into a mold and polyvinyl chloride (Vi-Chem Corporation, Grand Rapids, Mich.) injected to form the encapsulation.

The encapsulated plastic glazing coupons were then tested according to Honda Motor Company's N/K specification. As shown in Table 2, the encapsulated glazing coupons were observed to pass all of the tests listed in this specification by resulting in 100% cohesive failure of the PVC encapsulation. This example demonstrates that an encapsulated plastic glazing panel prepared according to one embodiment of the present invention can pass stringent OEM requirements for use as a window in a vehicle.

TABLE 2

|  | Exposure Conditions | Test Result (Pass = 100% cohesive) |
|---|---|---|
| Initial Pull | Ambient Temperature | PASS |
| Humidity Resistance | 50° C., 95% relative humidity for 90 days | PASS |
| Heat Resistance | 90° C. for 90 days | PASS |
| Thermal Cycle C | Heat, humidity, Cold cycling for 8 weeks | PASS |
| Hot Water Resistance | 80° C. for 100 hours | PASS |
| Hot Pull | Test at 90° C. | PASS |
| Cold Pull | Test at −40° C. | PASS |
| Cataplasma | Per IES60.014 protocol | PASS |
| Xenon Arc | 2000 hours per SAE J1960 protocol | PASS |

Example 3—Adhesion Differences in Weatherable and Abrasion Resistant Layers

Multiple plastic glazing panels were formed using Lexan® polycarbonate sheet (SABIC Innovative Plastics, Pittsfield, Mass.) into a substantially flat panel. The formed plastic panel was printed with an opaque border using a thermally curable ink (Exatec® PIX, Exatec LLC, Wixom, Mich.), which was subsequently cured according to the manufacturer's specification. A weatherable layer comprised of an acrylic primer (SHP-9X, Exatec LLC, Wixom, Mich.) and a silicon hard-coat (SHX, Exatec LLC) was applied over the opaque border and plastic panel. On about one-half of the panels, a silicon oxy-carbide abrasion resistant layer was deposited using expanding arc plasma enhanced chemical vapor deposition. The resulting plastic glazing panel is known as the Exatec® 900 glazing system (Exatec LLC, Wixom, Mich.). The glazing panels having the outer layer as the weatherable layer (e.g., no deposited abrasion resistant layer) is representative of the situation of the outer surface being a silicon hard-coat.

Adhesion promoters and a urethane adhesive bead was applied to the perimeter of the glazing panels having a silicon hard-coat surface and the glazing panels having an outer surface of an abrasion resistant layer. The adhesion promoters and urethane adhesive is known as the BETASEAL™ system offered by Dow Automotive, Auburn Hills, Mich. The adhesion promoters and urethane adhesive was cured according to the manufacturer's specification.

The glazing panels were then subjected to a Cataplasma test known to one skilled-in-the-art as Dow Automotive AG, Test Method No. 039E—Cataplasma Treatment. The Cataplasma test is also incorporated as one of the tests performed in the Honda Motor Company N/K test specification. The Cataplasma test exposes the plastic glazing panel along with cured adhesive beads applied to the surface of the glazing panel to high humidity at an elevated temperature followed by a low temperature shock (i.e., wrapping the glazing panel for 7 days in wet cotton at 70° C. followed by 3 hrs at −20° C.). Upon completion of the testing, and after being equilibrated at room temperature (about 23° C.) the adhesive bead is pulled on each test panel and the degree of cohesive failure of the adhesive is examined. In order for a printed plastic glazing panel to pass the Cataplasma test, there must be greater than 75% cohesive failure of the adhesive. Therefore, for the plastic glazing panel to pass the above test, the entire glazing panel, i.e., plastic panel 15/cured ink 20/cured weatherable layer 75/abrasion resistant layer 80 (if present) must exhibit a high level of hydrolytic stability at different temperatures and moisture conditions.

The inventors observed that the plastic glazing panels have a silicon hard-coat outer surface in contact with the adhesion promoters and urethane failed the test with less than about 2% cohesive failure of the urethane. Rather poor adhesion between the silicon hard-coat and the adhesion promoters and urethane caused the failure. On the other hand, all samples tested that incorporated an outer surface of the abrasion resistant layer were found to pass the test with greater than 75% cohesive failure of the urethane. This example demonstrates the difference in performance between a silicon hard-coat surface and the surface of the abrasion resistant layer. Similar results are obtainable when the adhesion promoters and urethane are replaced with similar adhesion promoters and an encapsulation.

A person skilled-in-the-art will recognize from the previous description that modifications and changes can be made to the present disclosure without departing from the scope of the disclosure as defined in the following claims. A person skilled-in-the-art will further recognize that the various measurements and tests described are standard measurements that can be obtained by a variety of different test methods. The test methods described in the examples represents only one available method to obtain each of the required measurements.

What is claimed is:

1. A plastic glazing panel for use as an automotive window or sunroof, the glazing panel comprising:
   a plastic substrate having an A-side major surface, a B-side major surface, and an edge;
   a plastic film with an ink cured on the plastic film, wherein the plastic film is disposed on the B-side major surface;
   wherein the ink forms an opaque border on the B-side major surface, along the edge;
   a first weatherable layer stacked onto the plastic film;
   a first abrasion resistant layer stacked onto the first weatherable layer and opposite the plastic film; wherein the first abrasion resistant layer comprises a silicon oxy-carbide, a hydrogenated silicon oxy-carbide, or a mixture or blend thereof;

a first encapsulation layer proximal to the edge; wherein the first encapsulation layer is in contact with the first abrasion resistant layer; and a first adhesion promoter layer located between the first abrasion resistant layer and the first encapsulation layer, wherein the first adhesion promoter layer comprises an adhesion promoter and a urethane adhesive.

2. The plastic glazing panel of claim 1, wherein the ink comprises a binder selected from the group consisting of a polyester-based, polycarbonate-based, and acrylate-based binder.

3. The plastic glazing panel of claim 1, wherein a thickness of the ink is 4 to 20 micrometers.

4. The plastic glazing panel of claim 1, wherein the opaque border encircles a viewing area.

5. The plastic glazing panel of claim 1, wherein the ink comprises a colorant, a filler, a surfactant, a defoamer, a tackifier, an adhesion promoter, a viscosity promoter, a weatherability additive, or a combination comprising at least one of the foregoing.

6. The plastic glazing panel of claim 1, wherein the ink comprises a hindered amine, a UV absorber molecule, or a combination comprising at least one of the foregoing.

7. The plastic glazing panel of claim 1, wherein the first encapsulation layer is part of a single encapsulation that wraps around the edge and encompasses at least a portion of the A-side major surface, the B-side major surface, and the edge of the plastic substrate and/or wherein the first encapsulation layer is one selected from the group consisting of polyvinyl chloride (PVC), thermoplastic elastomers, urethanes, and thermoplastic olefins.

8. The plastic glazing panel of claim 1, wherein the plastic film is in contact with the first weatherable layer.

9. The plastic glazing panel of claim 1, wherein the plastic substrate is selected from the group consisting of polycarbonate, acrylic, polyarylate, polyester, polysulfone, and a copolymer or mixture thereof.

10. The plastic glazing panel of claim 1, wherein the first weatherable layer is one selected from the group consisting of silicones, polyurethanes, acrylics, polyesters, epoxies, and a copolymer or mixture thereof.

11. The plastic glazing panel of claim 10, wherein the first weatherable layer uses ultraviolet absorbing (UVA) molecules to protect the plastic substrate from UV radiation.

12. The plastic glazing panel of claim 1, wherein the first weatherable layer is made up of a primer and a topcoat comprising a silicon hardcoat.

13. The plastic glazing panel of claim 1, wherein the first weatherable layer is made up of a primer and a topcoat; wherein the primer layer comprises an acrylic, a polyester, an epoxy, or a combination comprising at least one of the foregoing; and wherein the topcoat layer comprises polymethylmethacrylate, polyvinylidene fluoride, polyvinylfluoride, polypropylene, polyethylene, polyurethane, polymethacrylate, polyurethane-acrylates, polyacrylate, polyvinylidene fluoride, a silicone, or a combination comprising at least one of the foregoing.

14. The plastic glazing panel of claim 1, wherein the ink comprises a UV cured ink.

15. The plastic glazing panel of claim 1, further comprising a second weatherable layer, a second abrasion resistant layer, and a second encapsulation layer;

wherein the plastic film comprises a film primary side and a film secondary side; wherein the film primary side is in contact with the B-side major surface of the plastic substrate;

the first weatherable layer has a first weatherable primary side and a first weatherable secondary side; wherein the first weatherable primary side is in contact with the film secondary side;

the first abrasion resistant layer has a first abrasion primary side and a first abrasion secondary side; wherein the first abrasion primary side is in contact with the first weatherable secondary side;

the first encapsulation layer located on the first abrasion secondary side of the first abrasion resistant layer, proximal to the edge of the plastic substrate;

the first adhesion promoter layer located between the first abrasion secondary side and the first encapsulation layer;

the second weatherable layer has a second weatherable primary side and a second weatherable secondary side, wherein the second weatherable secondary side is in contact with the A-side major surface of the plastic substrate;

the second abrasion resistant layer has a second abrasion primary side and a second abrasion secondary side; wherein the second abrasion secondary side is in contact with the second weatherable primary side;

the second encapsulation layer located on the second abrasion primary side of the second abrasion resistant layer, proximal to the edge of the plastic substrate;

an optional second adhesion promoter layer located between a second abrasion primary side and the second encapsulation layer.

16. The plastic glazing panel of claim 15, wherein the second abrasion resistant layer is one selected from the group consisting of aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, hydrogenated silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, and a mixture or blend thereof.

17. The plastic glazing panel of claim 15, wherein the first encapsulation layer and the second encapsulation layer are part of a single encapsulation that wraps around the edge of the plastic glazing panel.

18. The plastic glazing panel of claim 15, wherein the optional second adhesion layer is present.

19. A plastic glazing panel for use as an automotive window or sunroof, the glazing panel comprising:

a plastic substrate having an A-side major surface, a B-side major surface, and an edge;

a plastic film with an ink cured on the plastic film, wherein the plastic film is disposed on the B-side major surface;

wherein the ink forms an opaque border on the B-side major surface, along the edge;

a first weatherable layer stacked onto the plastic film;

a first abrasion resistant layer stacked onto the first weatherable layer and opposite the plastic film; wherein the first abrasion resistant layer comprises a hydrogenated silicon oxy-carbide;

a first encapsulation layer proximal to the edge; wherein the first encapsulation layer is in contact with the first abrasion resistant layer; and a first adhesion promoter layer located between the first abrasion resistant layer and the first encapsulation layer, wherein the adhesion promoter layer comprises an adhesion promoter and a urethane adhesive.

* * * * *